(12) United States Patent
Maekawa

(10) Patent No.: US 6,358,303 B1
(45) Date of Patent: Mar. 19, 2002

(54) GASBORNE COMPONENT CONDENSING APPARATUS

(75) Inventor: Teisuke Maekawa, Tokyo (JP)

(73) Assignee: Taikisha, Ltd. (JP)

( * ) Notice: Subject to any disclaimer, the term of this patent is extended or adjusted under 35 U.S.C. 154(b) by 0 days.

(21) Appl. No.: 09/532,252

(22) Filed: Mar. 22, 2000

(30) Foreign Application Priority Data

Mar. 25, 1999 (JP) .......................................... 11-081199

(51) Int. Cl.⁷ .............................................. B01D 53/06
(52) U.S. Cl. ............................. 96/123; 96/125; 96/130; 96/144; 96/150
(58) Field of Search ........................... 95/113–115, 143; 96/122, 123, 125, 130, 143–145, 150

(56) References Cited

U.S. PATENT DOCUMENTS

| | | | |
|---|---|---|---|
| 2,799,363 A | * 7/1957 | Miller | 95/113 |
| 2,799,364 A | * 7/1957 | Miller | 95/113 |
| 2,823,764 A | * 2/1958 | Miller | 95/113 |
| 4,689,054 A | * 8/1987 | Vara et al. | 95/113 X |
| 4,701,189 A | * 10/1987 | Oliker | 95/113 |
| 4,775,394 A | * 10/1988 | Yamano et al. | 95/143 X |
| 4,946,479 A | * 8/1990 | Izumo | 96/123 |
| 5,057,128 A | * 10/1991 | Panzica et al. | 96/123 |
| 5,464,468 A | 11/1995 | Tanaka | 96/125 |
| 5,779,768 A | * 7/1998 | Anand et al. | 95/115 X |
| 5,788,744 A | * 8/1998 | Klobucar et al. | 95/113 |
| 5,908,490 A | * 6/1999 | Akamatsu et al. | 95/113 |
| 5,909,490 A | * 6/1999 | Akamatsu et al. | 95/113 |

* cited by examiner

Primary Examiner—Robert H. Spitzer
(74) Attorney, Agent, or Firm—Webb Ziesenheim Logsdon Orkin & Hanson, P.C.

(57) ABSTRACT

A gasborne component condensing apparatus condenses condensation-target component contained in treatment-object gas by effecting an adsorbing step for adsorbing the condensation-target component in the object gas to an adsorbent layer and a desorbing step for desorbing the condensation-target component adsorbed to the adsorbent layer at the adsorbing step into desorbing gas by causing the desorbing gas smaller in the amount and higher in the temperature than the object gas to pass the adsorbent layer after the adsorbing step, the apparatus effecting the adsorbing step and the desorbing step for a plurality of cycles, so that the desorbing gas delivered from the adsorbent layer and containing the condensation-target component desorbed during the desorbing step is collected as a condensed gas product. The condensing apparatus includes a construction for sorting the desorbing gas delivered from the adsorbent layer during the desorbing step between an earlier passage gas which passed the adsorbent layer at an earlier stage of the desorbing step and a later passage gas which passed the adsorbent layer at a later stage of the desorbing step and for subsequently causing the earlier passage gas, as a portion of the object gas, to pass the adsorbent layer again at a subsequent adsorbing step while allowing the later passage gas to be collected directly as the condensed gas product.

4 Claims, 4 Drawing Sheets

GASBORNE COMPONENT CONDENSING APPARATUS

BACKGROUND OF THE INVENTION

1. Field of the Invention

The present invention relates to a gasborne component condensing apparatus, for example, for use in condensing processes of various kinds of solvent vapor contained in exhaust air or gas generated from a painting facility, electronic-component manufacturing facility and so on.

The invention relates more particularly to a gasborne component condensing apparatus for condensing condensation-target component contained in treatment-object or object gas (i.e. gas to be treated) by effecting an adsorbing step for adsorbing the condensation-target component in the object gas to an adsorbent layer by causing the gas to pass the layer and a desorbing step for desorbing the condensation-target component adsorbed to the adsorbent layer at the adsorbing step into desorbing gas by causing the desorbing gas smaller in the amount and higher in the temperature than the object gas to pass the adsorbent layer after the adsorbing step, the apparatus effecting the adsorbing step and the desorbing step for a plurality of cycles, so that the desorbing gas delivered from the adsorbent layer and containing the condensation-target component desorbed during the desorbing step is collected as a condensed gas product.

2. Description of the Related Art

According to a conventional gasborne component condensing apparatus of the above-noted type, the entire amount of the desorbing gas caused to pass the adsorbent layer during the desorbing step (i.e. the entire amount of the desorbing gas delivered from the adsorbent layer and containing the condensation-target component desorbed from the adsorbent layer) is collected as a condensed gas product.

However, comparing an earlier stage of the desorbing step with a later stage of the same, the temperature of the adsorbent layer is still low at the earlier stage, so that much of the heat retained in the high-temperature desorbing gas caused to pass the adsorbent layer is used up for heating the adsorbent layer, so that there occurs a significant temperature drop which impairs the efficiency of the desorption of the condensation-target component adsorbed to the adsorbent layer. For this reason, at the such earlier stage of the desorbing step, the desorbing gas delivered from the adsorbent layer is lower in the concentration of the condensation-target component. Because of the above, according to the conventional apparatus, it was not possible to increase sufficiently the average concentration of the condensation-target component in the delivered desorbing gas (i.e. condensed gas product) through the entire step from the earlier stage to the later stage thereof, so that the concentration rate available from the apparatus would be limited disadvantageously.

Further, in case the condensed gas product obtained from this gasborne component condensing apparatus is subjected to an aftertreatment, an aftertreating facility of a greater treating capacity will be needed due to the limited concentration rate available from the condensing process as the "pretreatment", so that the cost of the facility itself and its running cost will be high and also a greater space will be needed for the installment of such large facility. Moreover, if the aftertreatment comprises a combustion treatment for combusting the condensation-target component contained in the condensed gas product, the insufficient concentration of the component such as solvent vapor leads to the need of a greater amount of combustion aiding fuel for the combusting process.

SUMMARY OF THE INVENTION

In view of the above-described state of the art, a primary object of the present invention is to provide a gasborne component condensing apparatus with improved construction which achieves a higher concentration rate without inviting physical enlargement of the apparatus or reduction in its processing capacity.

For accomplishing the above-noted object, a gasborne component condensing apparatus of the present invention, comprises gas sorting means for sorting the desorbing gas delivered from the adsorbent layer during said desorbing step between an earlier passage gas which passed the adsorbent layer at an earlier stage of the desorbing step and a later passage gas which passed the adsorbent layer at a later stage of the desorbing step and for subsequently causing said earlier passage gas, as a portion of the object gas, to pass the adsorbent layer again at a subsequent adsorbing step while allowing said later passage gas to be collected directly as the condensed gas product.

With the above-described construction, the desorbing gas delivered from the adsorbent layer during the desorbing step is sorted between the earlier passage gas which passed the adsorbent layer at an earlier stage of the step when the temperature of the adsorbent layer is still low and the efficiency of the desorption of the condensation-target component therefrom is also correspondingly low (that is, the desorbing gas which is delivered from the adsorbent layer with a low temperature, hence, with a low concentration of the target component) and the later passage gas which passed the adsorbent layer at a later stage of the step when the adsorbent layer has been heated to a sufficiently high temperature and the efficiency of the desorption of the target component therefrom is also correspondingly high (that is, the desorbing gas which is delivered from the adsorbent layer with a high temperature, hence, with a high concentration of the target component).

Then, the earlier passage gas, because of its low target-component concentration, is caused to pass, as a portion of the treatment-object gas, again the adsorbent layer, so that the condensation-target component contained therein is adsorbed to the adsorbent layer and then this adsorbed component is desorbed in the subsequent desorbing step into the small amount and higher temperature desorbing gas. On the other hand, the later passage gas delivered from the adsorbent layer with a high target-component concentration is directly collected as the condensed gas product.

Incidentally, with appropriate setting of the "sorting point or timing" where the earlier passage gas and the later passage gas are sorted from each other, both the concentration and temperature of the target component in the earlier passage gas may be rendered rather low. Further, as the desorbing gas is smaller in its amount and the earlier passage gas is even smaller in its amount, the addition of this earlier passage gas to the desorbing gas as an additional portion thereof, when caused to pass the adsorbent layer in the adsorbing step, will not cause any significant increase in the processing load or in the temperature in the adsorbing process, so that resultant reduction in the adsorbing capacity may be minimal. Hence, with utilization of the above-described two methods, the originally intended performance of adsorbing and collecting the condensation-target component contained in the object gas may be maintained satisfactorily.

Therefore, according to the present invention, the earlier passage gas delivered from the adsorbent layer with a lower target component concentration is subjected again to the condensing process, whereas the later passage gas delivered from the adsorbent layer with a higher target component concentration is collected directly as the condensed gas product. Then, in comparison with the conventional apparatus which directly obtains the entire amount of the desorbing gas passed through the adsorbent layer in the desorbing step as the condensed gas product, the concentration rate of the condensing process may be effectively increased, without inviting physical enlargement of the apparatus such as increase of weight and/or thickness of the adsorbent layer or any substantial reduction in the processing capacity.

Further, in case the condensed gas product obtained from the condensing apparatus is subjected to an aftertreatment, no significant additional treating capacity will be required of the aftertreatment facility since the concentration rate has already been increased to a sufficient degree in the condensing process as the pretreatment. Consequently, the cost of such aftertreatment facility per se as well as its running cost may be significantly reduced and the space required for installment of this facility too may be significantly reduced.

For example, if the above-described construction of the present invention is utilized in the conventional apparatus which is originally adapted for obtaining directly the entire amount of the desorbing gas passed through the adsorbent layer in the desorbing step as the condensed gas product, the concentration rate may be readily doubled, without making any change in the existing adsorbent layer and without any substantive reduction in the processing capacity of the apparatus. That is to say, if the conventional condensing apparatus originally provides a concentration rate on the order of 20 times, this apparatus, if added with the feature of the present invention, will be able to provide a concentration rate on the order of 40 times.

In causing the earlier passage gas as an additional portion of the object gas to pass again the adsorbent layer in the subsequent adsorbing step, it is conceivable to mix this earlier passage gas into "new" object gas which is caused to pass the adsorbent layer for the first time at the adsorbing step. Alternatively, the timing of passing the adsorbent layer and/or the passing portion within the adsorbent layer may be rendered different from each other between such new object gas and the earlier passage gas.

For accomplishing the above-noted object, according to the present invention, the above-described apparatus further comprises: a rotatable adsorbing rotor for supporting the adsorbent layer, the adsorbent layer extending in a rotational direction of the adsorbing rotor, the apparatus including, in juxtaposition along a rotational path of said rotor thereof, an adsorbing area where said object gas is caused to pass the adsorbent layer at a portion of the adsorbing rotor which portion is passing a predetermined area and a desorbing area where said desorbing gas is caused to pass the adsorbent layer at a portion of the adsorbing rotor which portion is passing a further predetermined area; and wherein said gas sorting means includes;
  a partitioning member for partitioning an outlet for the desorbing gas at the desorbing area into an upstream outlet portion located upstream in the rotational direction of the rotor and a downstream outlet portion located downstream in the rotational direction of the rotor,
  a return passage for guiding the desorbing gas delivered from the upstream outlet portion to an inlet for the object gas at the adsorbing area, and
  a takeoff passage for taking off the desorbing gas delivered from the downstream outlet portion as a condensed gas product.

According to the above-described construction, the period when the adsorbent layer at each portion of the rotor passes the adsorbing area in the rotational path of the rotor provides the adsorbing step for adsorbing the concentration-target component from the object gas, whereas the further period when the adsorbent layer of the rotor passes the desorbing area in the rotational path of the rotor provides the desorbing step for desorbing the adsorbed target component into the desorbing gas. Therefore, as the adsorbing rotor is revolved, the adsorption at the adsorbing area and the desorption at the desorbing area are effected alternately. As a result, the step at the adsorbing area for adsorbing and collecting the condensation-target component from the object gas (i.e. the "former step" in the condensing process) and the further step at the desorbing area for desorbing the adsorbed component into the small amount of desorbing gas (i.e. the "atter step" in the condensing process) may be carried out in continuous and parallel, namely, very efficient manner.

Further, as the partitioning member partitions the desorbing gas outlet at the desorbing area into the upstream outlet portion located upstream in the rotational direction of the rotor and the downstream outlet portion located downstream in the rotational direction of the rotor, the desorbing gas delivered through this outlet may be sorted between the earlier passage gas delivered from the upstream outlet portion which passed the adsorbent layer at an earlier stage of the desorbing process (i.e. the desorbing gas which passed the adsorbent layer at a rotor portion which had entered the desorbing area immediately before) and the later passage gas which passed the adsorbent layer at a later stage of the desorbing process (i.e. the desorbing gas which passed the adsorbent layer at a rotor portion which had entered the desorbing area relatively long before).

And, the desorbing gas delivered from the upstream outlet portion (i.e. the earlier passage gas delivered with a relatively low target-component concentration and low temperature) is then guided via the return passage to the object gas inlet at the adsorbing area, so that this gas, as an additional portion of the object gas, is caused to pass again the adsorbent layer at a portion of the adsorbing rotor which is now passing the predetermined area of the adsorbing area, so that this earlier passage gas may be subjected to another condensing step. Whereas, the desorbing gas delivered from the downstream outlet portion (i.e. the later passage gas delivered with a relatively high target-component concentration and high temperature) may be directly taken off from the apparatus as the condensed gas product through the takeoff passage.

That is, according to the invention described above, the former step of adsorbing and collecting the condensation-target component from the object gas and the latter step of desorbing the adsorbed target component into the desorbing gas are effected in continuous and parallel manner, so that the feeding operation of the object gas and the feeding operation of the desorbing gas may be carried out continuously. As a result, this adsorption/desorption condensing process may be effected as a continuous process of high efficiency.

And, by sorting the desorbing gas delivered from the desorbing area between the earlier passage gas to be subjected again to the condensing process as an additional portion of the object gas and the later passage gas which is to be collected directly as the condensed gas product by means of the sorting means including the partitioning member, the return passage and the takeoff passage, the effect of the invention, i.e. the possibility of high concentration rate, may be constantly achieved in such continuous condensing process.

Incidentally, according to the above construction, the desorbing gas delivered as the earlier passage gas from the upstream outlet portion is guided via the return passage to the object gas inlet of the desorbing area, so that this gas is caused to pass, as an additional portion of the new object gas, the adsorbent layer portion of the rotor at the adsorbing area. In doing this, it is conceivable to mix this earlier passage desorbing gas delivered from the upstream outlet portion with the new object gas to be caused to pass together the same adsorbent layer portion of the rotor at the adsorbing area. Alternatively, it is also conceivable to cause this desorbing gas from the upstream outlet portion and the new object gas to pass different portions of the adsorbent layer at the adsorbing area.

Further and other objects, features and advantages of this invention will become apparent from the following detailed description of the preferred embodiments thereof with reference to the accompanying drawings.

DESCRIPTION OF THE PREFERRED EMBODIMENTS

Preferred embodiments of a gasborne component condensing apparatus relating to this invention will be described in details with reference to the accompanying drawings.

General Construction of a Gas Treating System

Figure 1:
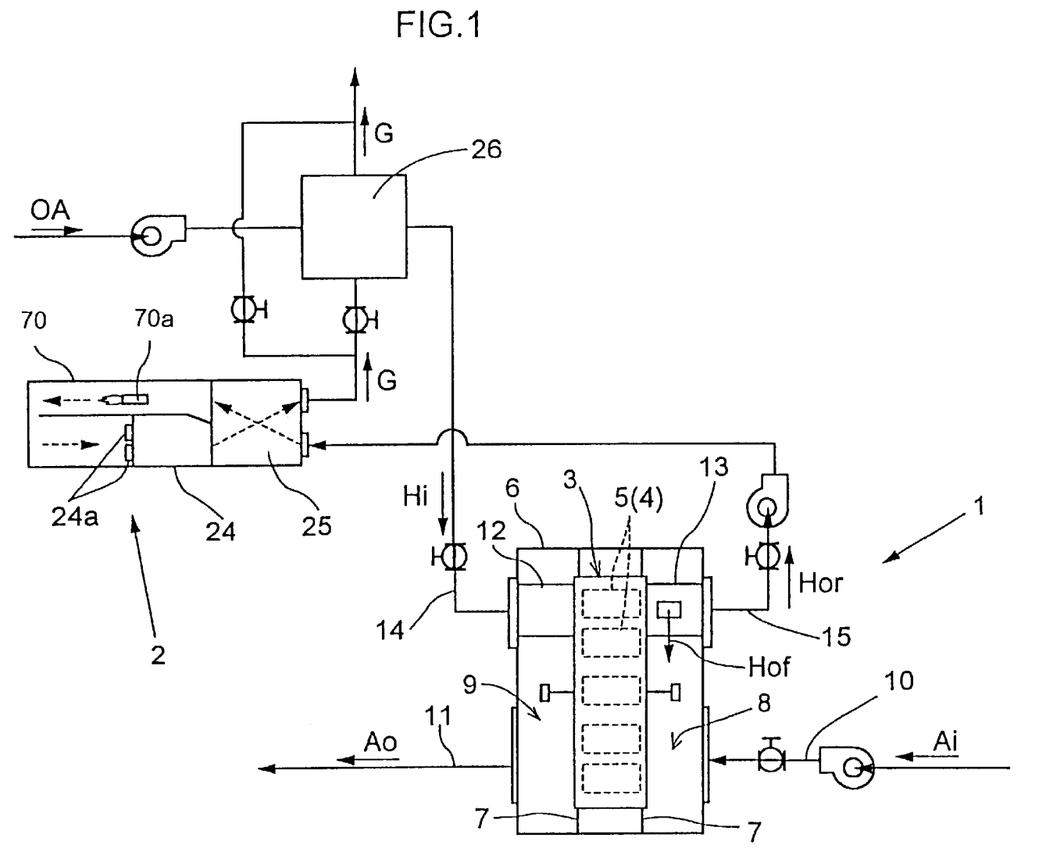
FIG. 1 is a schematic diagram showing construction of a gas treating system including a gasborne component condensing apparatus relating to the present invention.

FIG. 1 shows a gas treating system for treating treatment-object or object air Ai exhausted from a painting facility and containing vapor of paint solvent therein. This gas treating system includes a condensing apparatus 1 for condensing the solvent vapor contained in the object air Ai, and a catalytic combustion device 2 for aftertreating condensed air Hor whose solvent vapor concentration has been increased through the condensing treatment by the condensing apparatus 1.

Construction of the Condensing Apparatus

As shown in FIG. 1, the condensing apparatus 1 is an adsorption-desorption type apparatus including a cylindrical or disc-shaped adsorbing rotor 3. The adsorbing rotor 3 supports a plurality of adsorbing cassettes 5 juxtaposed along a rotational direction of the rotor. Each cassette 5 is a bottom-closed cylindrical body including an adsorbent layer 4 made of fibrous activated carbon affixed to its periphery.

The adsorbing rotor 3 is housed in a casing 6. The inside of this casing 6 is partitioned, by means of a pair of rotor peripheral partitioning walls 7 (extending vertically in the illustrated embodiment), in the direction of the axis (extending horizontally in the illustrated embodiment) of the adsorbing rotor 3, into an inlet chamber 8 facing one side of the rotor 3, an outlet chamber 9 facing the other side of the rotor 3, and a rotor-housing chamber interposed between the inlet chamber 8 and the outlet chamber 9. The inlet chamber 8 is connected with an inlet passage 10 for the object air Ai, and the outlet chamber 9 is connected with an outlet passage 11 for treated air Ao.

Further, at a different position than the inlet passage 10 and the outlet passage 11 relative to the rotational direction of the adsorbing rotor 3, there is provided an air-duct construction for causing desorbing air Hi to pass the adsorbing rotor 3 in the opposite direction to the object air Ai. This air-duct construction consists essentially of an inlet chamber 12 for introducing the desorbing air Hi into the adsorbing rotor 3 and an outlet chamber 13 for guiding the desorbing air Hi introduced into the adsorbing rotor 3 back to the outside of this rotor 3. The inlet chamber 12 and the outlet chamber 13 are arranged in opposition to each other in such a manner that respective openings thereof face each other across a portion of the adsorbing rotor 3. The inlet chamber 12 disposed on the side of the outlet chamber 9 is connected with an inlet passage 14 for the desorbing air Hi, and the outlet chamber 13 disposed on the side of the inlet chamber 8 is connected with a takeoff passage 15 for taking off or collecting the desorbing air Hi passed through the adsorbing rotor 3 as condensed gas product Hor.

Figure 2:
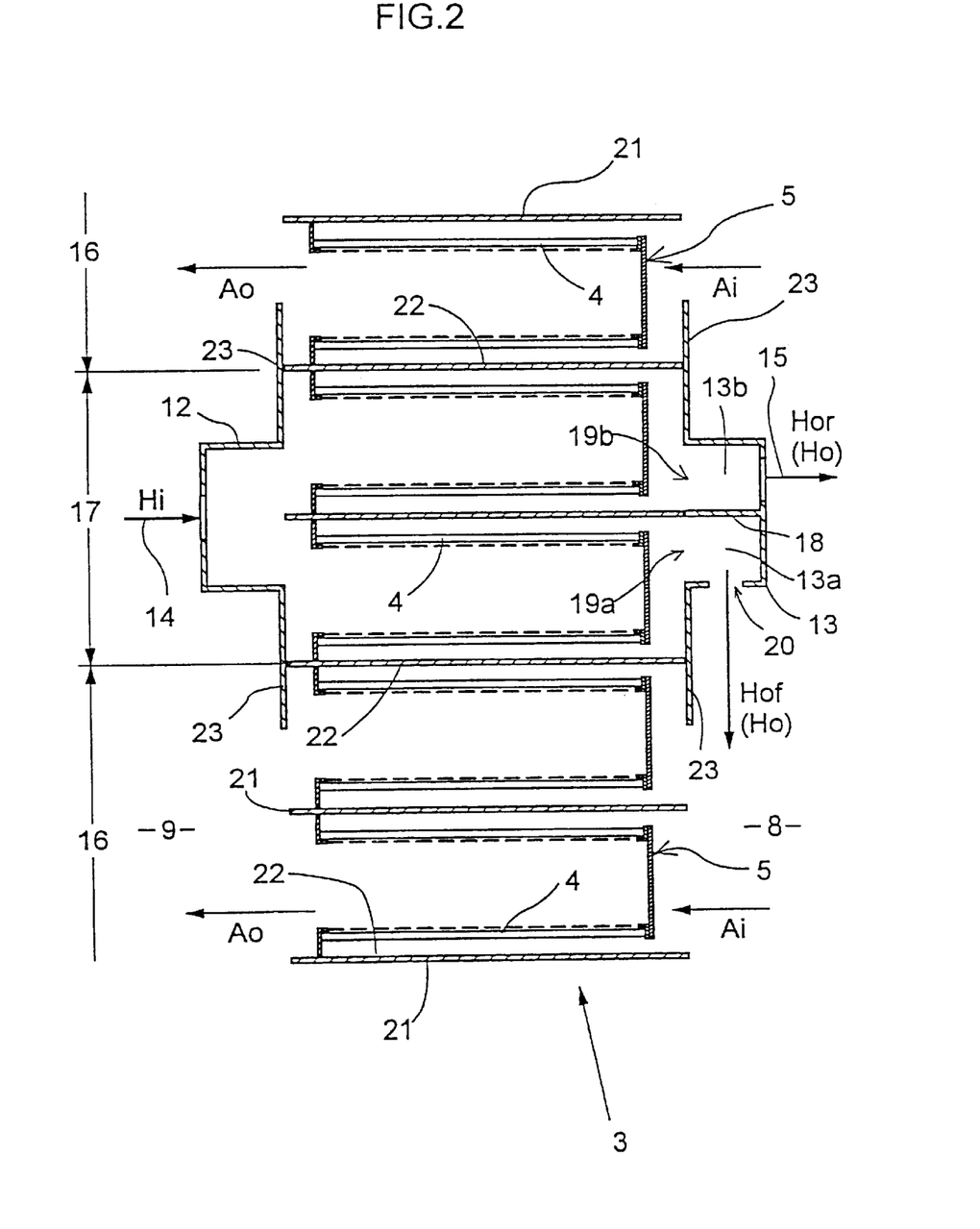
FIG. 2 is a developed plan view of an adsorbing rotor of the apparatus.
Figure 3:
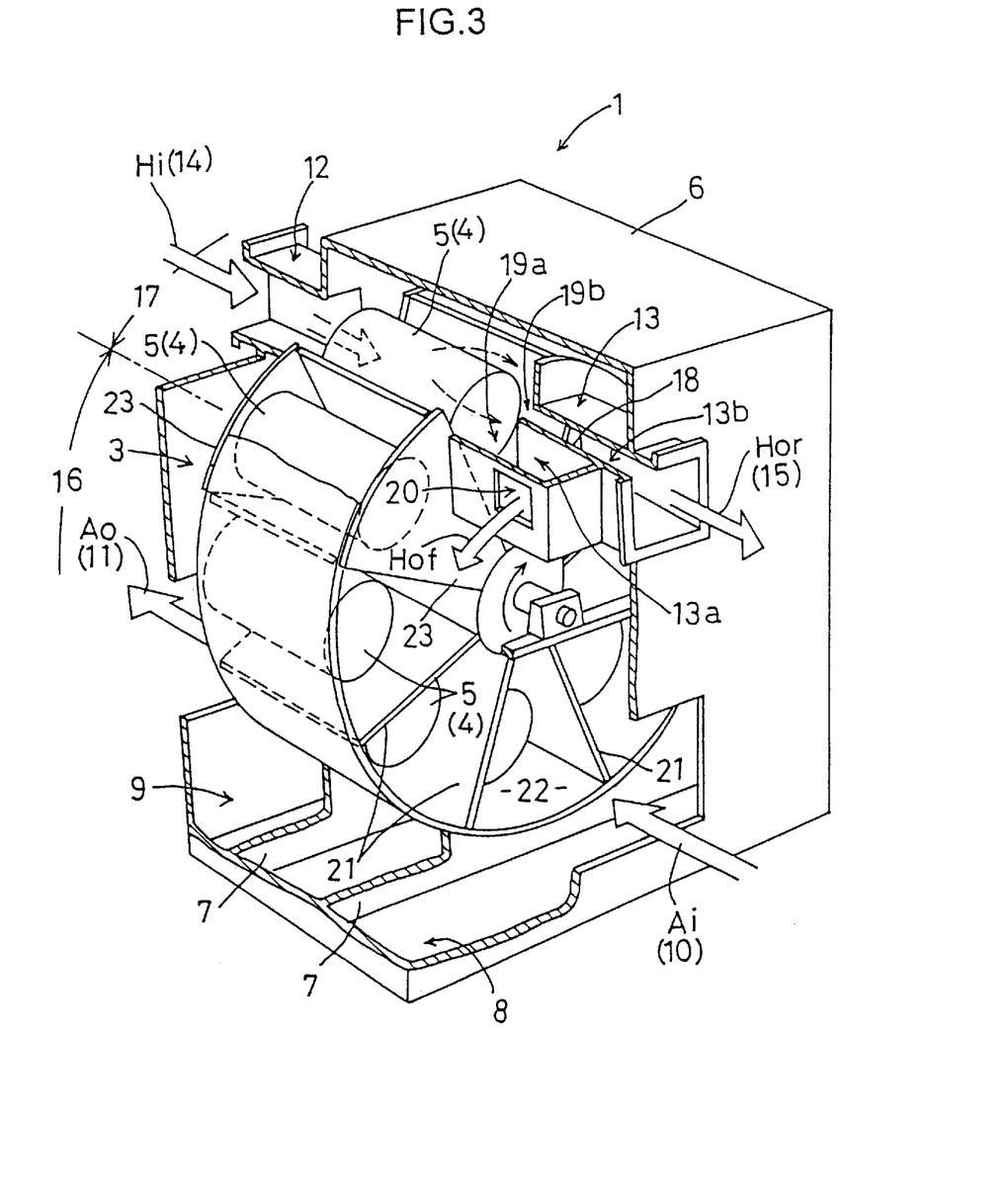
FIG. 3 is a perspective view of the adsorbing rotor.

Referring to FIGS. 1–3, as indicated by arrows in FIG. 3, in this condensing apparatus 1, in the rotational path of the adsorbing rotor 3, an area (an angular area in this embodiment) where the respective opposed side faces of the rotor 3 are open to the inlet chamber 8 and the outlet chamber 9 which are disposed inside the casing 6 is provided as an adsorbing area 16, whereas an area (another angular area in this embodiment) where the one portion of the rotor 3 is communicated with the inlet chamber 12 and the outlet chamber 13 for the desorbing air Hi is provided as a desorbing area 17.

At the adsorbing area 16, the treatment-object air Ai introduced through the inlet passage 10 into the inlet chamber 8 is caused to pass the adsorbent layer 4 of a particular portion of the adsorbing rotor 3 which portion is just passing this area. Then, the period when the object air Ai passes the adsorbing area 16 for the adsorbent layer 4 for each portion of the rotor comprises an "adsorbing step" for causing the object air Ai to pass the adsorbent layer 4 of this particular rotor portion to adsorb the solvent vapor borne in this object air Ai to the adsorbent layer 4. Specifically, the solvent vapor in the object air Ai is adsorbed to an adsorbent forming the adsorbent layer 4.

On the other hand, at the desorbing area 17, the high-temperature desorbing air Hi introduced through the inlet passage 14 into the inlet chamber 12 is caused to pass the adsorbent layer 4 of a particular portion of the adsorbing rotor 3 which portion is just passing this area. Then, the period when the desorbing air Hi passes the desorbing area 17 for the adsorbent layer 4 for each portion of the rotor comprises a "desorbing step" for causing the high-temperature desorbing air Hi to pass the adsorbent layer 4 of this particular rotor portion to desorb the adsorbed solvent vapor on the adsorbent layer 4 into the desorbing air Hi.

In this way, with each rotation of the adsorbing rotor 3, the adsorbing operation at the adsorbing area 16 for the adsorbent layer 4 at a particular portion of the rotor and the desorbing operation at the desorbing area 17 at a further particular portion of the rotor are effected alternately. Hence, the operation at the desorbing area 16 for adsorbing and collecting the solvent vapor from the object air or gas Ai and the further operation at the desorbing area 17 for desorbing the adsorbed and collected solvent vapor into the desorbing air or gas Hi are effected in a continuous and parallel manner.

In these adsorbing and desorbing operations, the amount of the desorbing air Hi caused to pass the adsorbent layer 4 at the desorbing area 17 is set to be smaller than the amount of the treatment-object air Ai caused to pass the adsorbent layer 4 at the adsorbing area 16. As a result, the concentration of the solvent vapor in the desorbing air Ho delivered from the desorbing area 17 into the outlet chamber 13 is rendered higher than the concentration of the solvent vapor in the object air Ai before its treatment through the adsorbent layer 4 at the adsorbing area 16. On the other hand, the treated object air Ao delivered into the outlet chamber 9 after having its solvent vapor eliminated through the adsorption and collection by the adsorbent layer 4 as the air was caused to pass the adsorbent layer 4 at the adsorbing area 16 is discharged via the outlet passage 11 to the outside as treated or cleaned air.

In this condensing apparatus 1, the outlet chamber 13 supports therein a partitioning member 18 for partitioning the inside of this chamber 13 into two sections, i.e. an upstream chamber 13a and a downstream chamber 13b with respect to the rotational direction of the adsorbing rotor 3. This partitioning member 18 is provided in the form of a plate-like body extending along the radial direction of the rotor 3 and partitions the outlet of the desorbing area 17 for the desorbing air Ho into an upstream outlet portion 19a located upstream in the rotational direction of the rotor and a downstream outlet portion 19b located downstream in the same direction.

From the upstream outlet portion 19a, there is delivered the desorbing air Ho which passed the rotor portion which had entered desorbing area 17 immediately before (this air or gas will be referred to as "earlier passage air " or gas "Hof" meaning desorbing gas which passed the adsorbent layer at an earlier stage of the desorbing process). Namely, the temperature of the adsorbent layer 4 at the rotor portion which has just entered desorbing area 17 is still low, so that much of the heat retained in the high-temperature desorbing gas Hi caused to pass the adsorbent layer 4 is used up for heating this adsorbent layer 4. Hence, there occurs a significant temperature drop which impairs the efficiency of the desorption of the condensation-target component, i.e. the solvent vapor, adsorbed to the adsorbent layer. For this reason, this earlier passage desorbing air Hof is low in the concentration of the condensation-target component.

In contrast, from the downstream outlet portion 19b, there is discharged the desorbing air Ho which passed the rotor portion which portion had entered the desorbing area 17 relatively long before, hence, had been held within this desorbing area 17 for a certain extended period after its entrance thereto (this air or gas will be referred to as "later passage air" or gas "Hor" meaning desorbing gas which passed the adsorbent layer at a later stage of the desorbing process). Namely, the temperature of the adsorbent layer 4 at the rotor portion which had been held within the desorbing area 17 for a certain extended period after its entrance thereto is already sufficiently high. Therefore, there occurs no such temperature drop due to the loss of the heat retained in the high-temperature desorbing air Hi in heating up the adsorbent layer 4, so that the desorbing operation of the target component may proceed efficiently. Therefore, this later passage desorbing air Hor is high in the concentration of the condensation-target component.

The side face of the upstream chamber 13a connected with the upstream outlet portion 19a defines a discharge opening 20 which is oriented in a direction traversing a linear gas passage extending from the inlet chamber 12 to the outlet chamber 13 and is open to the inlet chamber 8 for receiving the object air Ai. Therefore, this discharge opening 20 functions as a "return passage" for returning the entire amount of the earlier passage air Hof received into the upstream chamber 13a back to the inlet chamber 8.

Further, the downstream chamber 13b connected with the downstream outlet portion 19b of the outlet chamber 13 is communicated with the takeoff passage 15 for the condensed air, so that the entire amount of the later passage air Hor received into the downstream chamber 13b is collected through this takeoff passage 15.

Namely, as described above, the earlier passage air Hof which passed the adsorbent layer 4 at an earlier stage of the desorbing process is low in the solvent vapor concentration and is low in the temperature. Therefore, this air is discharged through the discharge opening 20 into the inlet chamber 8, so that it is mixed with new treatment-object air Ai fed from the inlet passage 10 to be caused to pass the adsorbing area 16 again. That is, this earlier passage air is subjected to another condensing operation. On the other hand, the later passage air Hor which passed the adsorbent layer 4 at a later stage of the desorption process is high in the solvent vapor concentration. Thus, this air is taken off or collected directly as condensed air product via the takeoff passage 15. In this manner, as the returning or "feed-back" operation of the earlier passage air Hof to the inlet chamber 8 and the collecting operation of the later passage air Hor are effected in the continuous and parallel manner, a high concentration rate may be achieved.

As shown in FIG. 3, the inside of the adsorbing rotor 3 is divided, by means of a plurality of partitioning walls 21 extending radially from the rotational axis of the rotor 3, into a plurality of adsorbing cassette compartments 22 in the rotational direction of the rotor. Also, on the opposed sides of the inlet chamber 12 and the outlet chamber 13 respectively, there are provided shielding plates 23 for preventing intrusion of the treatment-object air Ai into the adsorbing rotor 3 limitedly at a predetermined angular area corresponding to one adsorbing cassette compartment 22. That is to say, with rotation of the adsorbing rotor 3, the sides edge of the respective partitioning walls 21 come into opposition to the shielding plate 23 one after another. In this, while a certain partitioning wall 21 is placed i opposition to the shielding plate 23, a shielded condition is established between this partitioning wall 21 and the shielding plate 23. Accordingly, irrespectively of the rotational position of the adsorbing rotor 3, there does not occur such condition wherein a same single adsorbing cassette compartment 22 extends across the passage for the object air Ai and also the passage for the desorbing air Hi at the same time. Namely, the shielding plates 23 prevent inadvertent mixing of the object air Ai and the desorbing air Hi via a common adsorbing cassette compartment 22.

Incidentally, each partitioning wall 21 prevents the desorbing air Hi introduced into one compartment 22 of the rotor 3 from moving directly into another adjacent compartment 22. Hence, it may be said that this wall 21, in cooperation with the partitioning member 18 of the outlet chamber 13, functions to guide earlier passage air Hof into the upstream chamber 13a of the outlet chamber 13 and functions also to guide the later passage air Hor into the downstream chamber 13b of the outlet chamber 13.

Construction of the Catalytic Combustion Device

Referring to FIG. 1, the condensed air product Hor collected through the takeoff passage 15 of the condensing apparatus 1 is then fed to the catalytic combustion device 2 for its aftertreatment. This catalytic combustion device 2 includes an aiding combustion chamber 70 having an aiding combustion burner 70a and a combustion chamber 24 having a catalytic layer 24a. In operation, the condensed air Hor fed from the takeoff passage 15 of the condensing apparatus 1 is led through the aiding combustion chamber 70 into the combustion chamber 24, so that the air is caused to pass the catalytic layer 24a in this combustion chamber 24. In the course of this passage through the catalytic layer 24, the high-concentration solvent vapor in the condensed air Hor is catalytically combusted in an efficient manner.

This catalytic combustion device 2 further includes a preheating heat exchanger 25 disposed adjacent both the aiding combustion chamber 23 and the combustion chamber 24. This preheating heat exchanger 25 functions to preheat the condensed air Hor fed from the condensing apparatus 1 with a high-temperature combustion gas G discharged from the combustion chamber 24.

This catalytic combustion device 2 further includes a preheating heat exchanger 25 disposed adjacent both the aiding combustion chamber 70 and the combustion chamber 24. This preheating heat exchanger 25 functions to preheat the condensed air Hor fed from the condensing apparatus 1 with a high-temperature combustion gas G discharged from the combustion chamber 24.

Construction of Desorbing Heat Exchanger

Referring still to FIG. 1, between the condensing apparatus 1 and the catalytic combustion device 2, there is disposed a desorbing heat exchanger 26. This desorbing heat exchanger 26 receives the high-temperature combustion gas G which has preheated the condensed air Hor in the preheating heat exchanger 25 of the catalytic combustion device 2 and receives also ambient air OA introduced from the outside, so as to heat the introduced ambient air OA with the high-temperature combustion gas G. Then, this heated ambient air OA produced from the desorbing heat exchanger 26 is fed back to the condensing apparatus 1 as the high-temperature desorbing air Hi described hereinbefore.

OTHER EMBODIMENTS

Referred to FIGS. 1–3, other embodiments of the condensing apparatus relating to the present invention will be described.

In the foregoing embodiment, the adsorbing rotor 3 comprises the disc-shaped adsorbing rotor 3 mounting a plurality of bottom-closed cylindrical adsorbing cassettes 5 juxtaposed along the rotational direction of the rotor. In embodying the present invention, the construction of the adsorbing rotor is not limited thereto. Instead, the rotor may be a disc-shaped adsorbing rotor including a plurality of adsorbent-layer "blocks" juxtaposed along the rotational direction of the rotor. Or, it may be a cylindrical adsorbing rotor rotatable about the cylinder axis, through which the gas or air is caused to pass in the direction perpendicular to the rotational axis. Further alternatively, the rotor may be one having an endless rotary construction mounting a belt-like adsorbent layer thereon.

Also, the condensing apparatus of the invention is not limited to above-described type using an adsorbing rotor. Instead, the apparatus may be a type which selectively allows the passages of the treatment-object gas or air Ai and the desorbing gas or air Hi at different timings from each other relative to an adsorbent layer which is maintained still. In such case, the sorting means for sorting between the earlier passage gas Hof and the later passage gas Hor may be constructed of a valve device for periodically switching the outlet passage for the desorbing air Ho delivered from the adsorbent layer so as to sort between the earlier passage gas Hof and the later passage gas Hor.

In the foregoing embodiment, both the treatment-object gas Ai and the desorbing gas Hi consist mainly of air. These gases Ai and Hi are not limited to those composed mainly of air. Further, the adsorbent constituting the adsorbent layer may be activated carbon, zeolite, etc. as usual or may be various other materials which can be conveniently determined depending on the condensation-target component to be adsorbed.

With the condensing apparatus of the invention, the sorting "point" between the earlier passage gas Hof and the later passage gas Hor, namely, the sorting point between an earlier stage and a later stage in the desorbing process, is not limited to the mid point in the desorbing process. Instead, depending on various conditions, the sorting point may be set closer to the start point or the end point of the desorbing process.

Further, the sorting means may be adapted to vary the sorting point between the earlier passage gas Hof and the later passage gas Hor, depending on various conditions. If such construction is to be realized in the first embodiment described above, this is possible by e.g. adapting the position of the partitioning member 18 to be variable along the rotational direction of the adsorbing rotor 3. Further, for realizing the above-described construction for periodically and selectively feeding the object gas Ai and the desorbing gas Hi to a stationary adsorbent layer in the condensing apparatus, this is possible by 1 for example, adapting the timing of switching over of the object gas Ai and the desorbing gas Hi to be variably settable.

Needless to say, the application of the condensing apparatus of the invention is not limited to condensation of solvent vapor contained in exhaust air from a painting facility. Instead, this apparatus may be employed for condensation of cleaning agent contained in exhaust air from an electronic component manufacturing facility or condensation of alcohol contained in exhaust gas from a food processing factory, etc. In these manners, the apparatus may be employed for condensation treatment of various gasborne components generated in a variety of fields. The treatment-object gas and the condensation-target component may be any gas or any component. Further, when an aftertreatment is effected on the condensed gas product, such aftertreatment is not limited to the combustion treatment described hereinbefore, but may be any other kind of aftertreatment. (embodiment relating to an exhaust gas treating system using the condensing apparatus of the invention in combination with a gas turbine)

Figure 4:
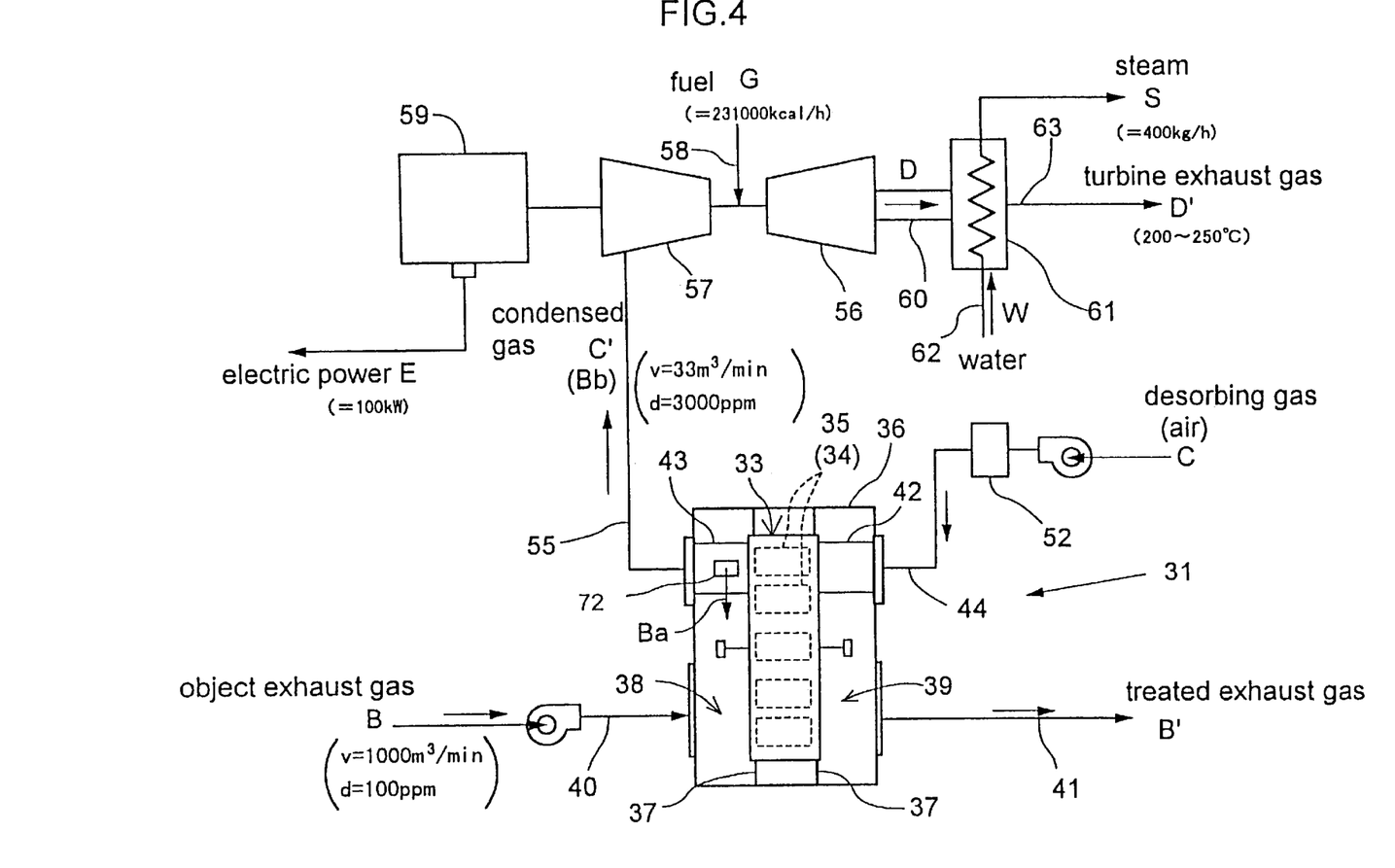
FIG. 4 is a schematic diagram showing an exhaust gas treating system including the gasborne component condensing apparatus relating to the present invention and a gas turbine.

FIG. 4 shows, as another application of the condensing apparatus relating to the present invention, an exhaust gas treating system for treating organic solvent containing exhaust gas B generated from for example, a painting facility, a semiconductor/electronic component manufacturing factory, etc. This system employs a gas turbine in addition to the condensing apparatus. This exhaust gas treating system consists mainly of a condensing apparatus 31 and a gas turbine 56. The condensing apparatus 31 has substantially identical construction to the condensing apparatus 1 described in the first embodiment described hereinbefore. The gas turbine 56 is coupled with an associated compressor 57 sharing the same rotational axis as the gas turbine 56.

Different from the apparatus of the foregoing embodiment, the condensing apparatus 31 relating to this embodiment condenses an organic component (e.g. toluene, xylene, etc.) which is contained in a low concentration within treatment-object exhaust gas B introduced via an exhaust gas inlet passage 40 so as to produce condensed gas C' which has an increased organic component concentration. This apparatus 31 employs the condensing method wherein desorbing gas C (air in this embodiment) which is smaller in the amount than the treatment-object exhaust gas B is introduced from a desorbing gas inlet passage 44 so as to desorb the organic component in the gas G into this smaller amount of desorbing gas C.

The treated exhaust gas B' (cleaned gas) which has had its organic component removed and desorbed into the desorbing gas C by the condensing apparatus 31 is exhausted from the system via a treated exhaust gas discharge passage 41.

On the other hand, the condensed gas C' which has caused to bear the organic component removed from the exhaust gas B by the condensing apparatus 31 is then delivered, as combustion oxygen-containing gas, via a condensed gas outlet passage 55 into the associated compressor 57 of the gas turbine 56.

The gas turbine 56 runs on the combustion of the produced condensed gas C' fed via the compressor 57 from the condensing apparatus 31 and fuel (e.g. natural gas) G fed from a fuel supply passage 58, so as to generate a power.

The compressor 57 is connected with a generator 59 for generating electric power E from the power generated by the gas turbine 56. The turbine exhaust gas D discharged from a turbine outlet of the gas turbine 56 is guided via a discharge passage 60 to an exhaust boiler 61. In this boiler 61, water W fed from a water supply passage 62 is heated by the turbine exhaust gas D to produce high-temperature steam S. Accordingly, the electric power E generated by the generator 59 and the steam S generated from the exhaust boiler 61 may both be utilized for the main production activity of a factory for instance. The turbine exhaust gas D' which has been used for the generation of steam in the exhaust boiler 61 is then discharged to the outside via a discharge passage 63.

That is to say, according to this exhaust gas treating system, the condensed gas C' which has removed and desorbed the organic component from the object exhaust gas B is fed as combustion oxygen-containing gas to the gas turbine 56 together with the fuel G. Hence, as a final process of the exhaust gas treatment subsequent to the organic component desorption by the condensing apparatus 31, the organic component desorbed to the condensed gas C' is decomposed through oxidation by means of the combustion in the gas turbine 56. Also, the heat generated in association with this decomposition process is recovered in the form of the electric power E from the generator 59 and the steam S from the exhaust boiler 61 so as to be efficiently utilized for the manufacturing operation of the factory. Consequently, the energy consumption and $CO_2$ generation of the entire factory may be both reduced.

Further, by feeding the condensed gas C' of which organic component concentration has been increased by the condensing apparatus 31 to the gas turbine 56 as combustion oxygen-containing gas, the amount of the organic component to be introduced into the gas turbine 56 is increased, so that the fuel consumption of the gas turbine 56 may be significantly reduced (in the case of the present embodiment, the fuel consumption may be reduced to about 60% of that of a case without such introduction of organic component). Whereby, the energy saving effect and the $CO_2$ generation reducing effect may be further improved.

The rotary adsorption-desorption device employed in the condensing apparatus 31 is substantially identical to that employed and described in the first embodiment. Namely, this is an adsorption-desorption type device including a disc-shaped adsorbing rotor 33. The adsorbing rotor 33 supports a plurality of adsorbing cassettes 35 juxtaposed along a rotational direction of the rotor. Each cassette 35 is a bottom-closed cylindrical body including an adsorbent layer 34 made of fibrous activated carbon affixed to its periphery.

The adsorbing rotor 33 is housed in a casing 36. The inside of this casing 36 is partitioned, by means of a pair of rotor peripheral partitioning walls 37 disposed adjacent one and the other faces of the rotor 33 respectively along the rotational direction of the rotor, into an inlet chamber 38 facing one side of the rotor 33, an outlet chamber 39 facing the other side of the rotor 33, and a rotor-housing chamber interposed between the inlet chamber 38 and the outlet chamber 39. The inlet chamber 38 is connected with an inlet passage 40 for the treatment-object exhaust gas B, and the outlet chamber 39 is connected with an outlet passage 41 for treated exhaust gas B'.

Further, at a position in the rotational direction of the adsorbing rotor 33, there is provided an air-duct construction for causing desorbing gas C to pass the adsorbing rotor in the opposite direction to the object gas B. This air-duct construction consists essentially of an inlet chamber 42 for introducing the object gas B into the adsorbing rotor 33 and an outlet chamber 43 for discharging the gas B. The inlet chamber 42 and the outlet chamber 43 are arranged in opposition to each other in such a manner that respective openings thereof face each other across a portion of the adsorbing rotor 33. The inlet chamber 42 disposed on the side of the outlet chamber 39 is connected with an inlet passage 44 for the desorbing gas, and the outlet chamber 43 disposed on the side of the inlet chamber 38 is connected with a takeoff passage 55 for taking off or recovering the desorbing gas passed through the adsorbing rotor 33 as condensed gas product C'.

Also, as shown in FIG. 4, the desorbing gas inlet passage 44 incorporates therein a heater 52 as a desorbing heating source for preheating the desorbing gas C to be introduced into the condensing apparatus 31.

The detailed construction and functions of this condensing apparatus 31 are basically the same as those of the condensing apparatus 1 relating to the first embodiment, including the feature of the partitioning member being provided in the outlet chamber 43 for the desorbing gas C for partitioning the inside of this chamber into an upstream chamber and a down stream chamber along the rotational direction of the rotor. Therefore, they will not be described here.

Incidentally, FIG. 4 also shows a communicating opening 72 for discharging the earlier passage gas Ba introduced into the upstream chamber from the upstream outlet portion connected with the upstream chamber of the outlet chamber 43 back into the inlet chamber 38 for the exhaust gas B.

That is to say, the earlier passage gas Ba which passed the adsorbent layer 34 at an earlier stage of the desorbing process is low in the organic component concentration and it would cause a significant temperature drop. Therefore, this gas is discharged through the communicating opening 72 into the inlet chamber 38, so that this gas is mixed with new treatment-object exhaust gas B fed from the inlet passage 40 to be caused to pass the adsorbing area again. Hence, this earlier passage gas is subjected to another condensing operation. On the other hand, the later passage gas Bb which passed the adsorbent layer 34 at a later stage of the desorption process and which is delivered from the downstream outlet portion is high in the organic component concentration. Thus, this gas is directly recovered via the downstream chamber of the outlet chamber 43 and the condensed gas takeoff passage 55 connected therewith as condensed gas product C' to be delivered to the gas turbine 56. With this construction, the concentration rate of the gasborne organic component may be maintained high, while avoiding the adverse effect at the earlier stage of the desorbing process characterized by lower adsorption efficiency.

The following are some examples of air or gas volumes and concentration values at the respective sections of the exhaust gas treating system relating to this embodiment.

| exhaust gas B: | gas volume v = 1000 m³/min organic component concentration d = 100 ppm |
|---|---|
| condensed gas C': | gas volume v = 33 m³/min organic component concentration d = 3000 ppm (thus, the concentration rate of 30 times) |
| power output of generator 59: | E = 100 kW |
| fuel consumption of gas turbine 56: | G = 231000 kcal/h |
| steam output of exhaust boiler 61: | S = 400 kg/h |
| temperature of turbine exhaust gas: | D' = 200 to 250° C. |

In the above embodiment, the heat retained in the turbine exhaust gas C is recovered in the form of steam S by using the exhaust boiler 61. However, the manner of recovering the heat of the turbine exhaust gas D' is not limited thereto. For instance, the heat may be recovered also in the form of hot water or hot air by using various types of heat exchangers.

Further, the electric power E generated by driving the generator 59 by means of the gas turbine 56 or the heat recovered from the turbine exhaust gas D' may be utilized for any other purpose than that in the facility generating such power E or the exhaust gas B therein. Instead, they may be utilized for a different facility than the facility generating the exhaust gas B.

Although it is preferred that the organic component concentration of the condensed gas C' to be fed to the gas turbine 56 as the combustion oxygen-containing gas be set to 3000 ppm or higher, the specific concentration value thereof may vary, depending on various conditions. In some cases, it may be set to 3000 ppm or lower. Further, in the foregoing embodiment, air is employed as the desorbing gas C which is used as the "source gas" for the condensed gas C'. However, as this source gas for the condensed gas C' (the desorbing gas C in case the adsorption-desorption apparatus is employed as the condensing apparatus 31), any other kind of gas than air may be employed as long as the condensed gas C' produced therefrom is usable as the combustion oxygen-containing gas for the gas turbine 56.

Moreover, the exhaust gas treating system described above may be used not only for the treatment of the organic solvent containing gas generated from a painting facility or a semiconductor/electronic component manufacturing facility, but also for treatment of other kinds of exhaust gases containing various kinds of organic components.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A gasborne component condensing apparatus for condensing condensation-target component contained in treatment-object gas by effecting an adsorbing step for adsorbing the condensation-target component in the object gas to an adsorbent layer and a desorbing step for desorbing the condensation-target component adsorbed to the adsorbent layer at the adsorbing step into desorbing gas by causing the desorbing gas smaller in the amount and higher in the temperature than the object gas to pass the adsorbent layer after the adsorbing step, the apparatus effecting the adsorbing step and the desorbing step for a plurality of cycles, so that the desorbing gas delivered from the adsorbent layer and containing the condensation-target component desorbed during the desorbing step is collected as a condensed gas product;

wherein said condensing apparatus comprises gas sorting means for sorting the desorbing gas delivered from the adsorbent layer during said desorbing step between an earlier passage gas which passed the adsorbent layer at an earlier stage of the desorbing step and a later passage gas which passed the adsorbent layer at a later stage of the desorbing step and for subsequently causing said earlier passage gas, as a portion of the object gas, to pass the adsorbent layer again at a subsequent adsorbing step while allowing said later passage gas to be collected directly as the condensed gas product; and a gas sorting position between the earlier passage gas and the later passage gas of said gas sorting means is adjustable, so that both the concentration and the temperature of the target component may be adjusted.

2. The gasborne component condensing apparatus according to claim 1, further comprising a rotatable adsorbing rotor for supporting the adsorbent layer, the adsorbent layer extending in a rotational direction of the adsorbing rotor, the apparatus including, in juxtaposition along a rotational path of said rotor thereof, an adsorbing area where said object gas is caused to pass the adsorbent layer at a portion of the adsorbing rotor which portion is passing a predetermined area and a desorbing area where said desorbing gas is caused to pass the adsorbent layer at a portion of the adsorbing rotor which portion is passing a further predetermined area; and wherein said gas sorting means includes;

a partitioning member for partitioning an outlet for the desorbing gas at the desorbing area into an upstream outlet portion located upstream in the rotational direction of the rotor and a downstream outlet portion located downstream in the rotational direction of the rotor, said partitioning member being adjustable in position along the rotational direction of the rotor;

a return passage for guiding the desorbing gas delivered from the upstream outlet portion to an inlet for the object gas at the adsorbing area; and a takeoff passage for taking off the desorbing gas delivered from the downstream outlet portion as a condensed gas product.

3. A gasborne component condensing apparatus for condensing condensation-target component contained in treatment object gas, the apparatus comprising:

a rotatable adsorbing rotor for supporting an adsorbent layer, the adsorbent layer extending in a rotational direction of the adsorbing rotor;

an adsorbing area and a desorbing area provided in juxtaposition along a rotational path of said rotor thereof, said adsorbing area effecting an adsorbing step where said object gas is caused to pass the adsorbent layer at a portion of the adsorbing rotor which portion is passing a predetermined area, said desorbing area effecting a desorbing step where said desorbing gas is caused to pass the adsorbent layer at a portion of the adsorbing rotor which portion is passing a further predetermined area; and gas sorting means for sorting the desorbing gas delivered from the adsorbent layer during said desorbing step between an earlier passage gas which passed the adsorbent layer at an earlier stage of the desorbing step and a later passage gas which passed the adsorbent layer at a later stage of the desorbing step and for subsequently causing said earlier passage gas, as a portion of the object gas, to pass the adsorbent layer again at a subsequent adsorbing step while allowing said later passage gas to be collected directly as the condensed gas product, said gas sorting means including;

a partitioning member for partitioning an outlet for the desorbing gas at the desorbing area into an upstream outlet portion located upstream in the rotational direction of the rotor and a downstream outlet portion located downstream in the rotational direction of the rotor, said partitioning member being adjustable in position along the rotational direction of the rotor, a return passage for guiding the desorbing gas delivered from the upstream outlet portion to an inlet for the object gas at the adsorbing area, and a takeoff passage for taking off the desorbing gas delivered from the downstream outlet portion as a condensed gas product.

4. A gasborne component condensing apparatus for condensing condensation-target component contained in treatment object gas, the apparatus comprising:

a rotatable adsorbing rotor for supporting an adsorbent layer, the adsorbent layer extending in a rotational direction of the adsorbing rotor;

an adsorbing area and a desorbing area provided in juxtaposition along a rotational path of said rotor thereof, said adsorbing area effecting an adsorbing step where said object gas is caused to pass the adsorbent layer at a portion of the adsorbing rotor which portion is passing a predetermined area, said desorbent area effecting a desorbing step where said desorbing gas is caused to pass the adsorbent layer at a portion of the adsorbing rotor which portion is passing a further predetermined area;

an inlet chamber for guiding the desorbing gas into the adsorbing rotor;

an outlet chamber for guiding the desorbing gas introduced into the adsorbing rotor out of the adsorbing rotor again;

said outlet chamber including:

a partitioning member for partitioning inside of the outlet chamber into an upstream chamber and a downstream chamber relative to the rotational direction of the adsorbing rotor, said upstream chamber receiving an earlier passage gas which passed the adsorbent layer at an earlier stage of the desorbing step, said downstream chamber receiving a later passage gas which passed the adsorbent layer at a later stage of the desorbing step, said upstream chamber defining, in a side face thereof, a discharge opening traversing a gas passage extending from said inlet chamber to said outlet chamber, said discharge opening being open into an entrance for guiding the treatment object gas into the adsorbing rotor and returning the entire earlier passage gas received in the upstream chamber to said entrance, and said upstream chamber forming, in communication therewith, a takeoff passage for collecting the later passage gas received in the downstream chamber as a condensed gas product.

* * * * *

UNITED STATES PATENT AND TRADEMARK OFFICE
CERTIFICATE OF CORRECTION

PATENT NO.    : 6,358,303 B1
DATED         : March 19, 2002
INVENTOR(S)   : Teisuke Maekawa It is certified that error appears in the above-identified patent and that said Letters Patent is hereby corrected as shown below:

<u>Title page,</u>
Item [56], References Cited, delete "5,909,490 A * 6/1999 Akamatsu et al."

<u>Column 8,</u>
Line 42, "i" should read -- in --.

<u>Column 9,</u>
Lines 12-28, delete "This catalytic combustion device 2 further includes a preheating heat exchanger 25 disposed adjacent both the aiding combustion chamber 23 and the combustion chamber 24. This preheating heat exchanger 25 functions to preheat the condensed air Hor fed from the condensing apparatus 1 with a high-temperature combustion gas G discharged from the combustion chamber 24."
Line 43, "Referred" should read -- Referring --.

<u>Column 10,</u>
Line 31, "by 1 for" should read -- by, for --.
Line 55, after "from" insert -- , --.

Signed and Sealed this

Seventeenth Day of September, 2002

*Attest:*

JAMES E. ROGAN
*Attesting Officer*   *Director of the United States Patent and Trademark Office*